(12) United States Patent
Gong et al.

(10) Patent No.: US 10,325,310 B2
(45) Date of Patent: Jun. 18, 2019

(54) NOTIFYING DEVICE, PROGRAM, NON-TRANSITORY RECORDING MEDIUM, AND METHOD

(71) Applicant: RAKUTEN, INC., Tokyo (JP)

(72) Inventors: Hyoseok Gong, Shinagawa-ku (JP); Yoovraj Shinde, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 562 days.

(21) Appl. No.: 14/904,889

(22) PCT Filed: May 20, 2014

(86) PCT No.: PCT/JP2014/063357
§ 371 (c)(1),
(2) Date: Jan. 13, 2016

(87) PCT Pub. No.: WO2015/177868
PCT Pub. Date: Nov. 26, 2015

(65) Prior Publication Data
US 2016/0140650 A1    May 19, 2016

(51) Int. Cl.
*G06Q 10/06* (2012.01)
*G06Q 30/06* (2012.01)
(Continued)

(52) U.S. Cl.
CPC ....... *G06Q 30/08* (2013.01); *G06Q 10/06311* (2013.01); *G06Q 10/063116* (2013.01);
(Continued)

(58) Field of Classification Search
None
See application file for complete search history.

(56) References Cited

U.S. PATENT DOCUMENTS 8,682,744 B2 * 3/2014 Emura .................... H04L 51/00
705/26.1
9,866,464 B1 * 1/2018 Miltenberger .......... H04L 43/10
(Continued)

FOREIGN PATENT DOCUMENTS

JP       2003/016307 A   *   1/2003
JP       2007-4781 A         1/2007
(Continued)

OTHER PUBLICATIONS

Machine Translation of JP 2003-016307 A, to Nakasaki et al., Japanese Patent Office, Jul. 12, 2018.*
(Continued)

*Primary Examiner* — Nicholas D Rosen
(74) *Attorney, Agent, or Firm* — Sughrue Mion, PLLC

(57) ABSTRACT

A notifying device (300) includes an information obtaining unit (320) obtaining, for each of the plurality of transactions, a notification date and hour preceding by a set time interval from the deadline for each transaction. The notifying device (300) includes a notification sending unit (370) sending, to a user who watches each transaction, a notification of the deadline for each transaction after the notification date and hour obtained for each transaction comes. The notifying device (300) also includes a calculating unit (340) calculating a reaction level to the notifications sent by the notification sending unit for the plurality of transactions based on an action taken for each transaction by the deadline thereof by the user to whom the notification associated with each transaction is sent. The notifying device (300) further includes an updating unit (350) updating the time interval so as to improve the calculated reaction level.

9 Claims, 17 Drawing Sheets

(51) Int. Cl.
*G06Q 30/08* (2012.01)
*H04L 12/58* (2006.01)

(52) U.S. Cl.
CPC .......... *G06Q 30/0611* (2013.01); *H04L 51/24* (2013.01); *G06Q 30/06* (2013.01); *G06Q 30/0601* (2013.01)

(56) References Cited

U.S. PATENT DOCUMENTS

| | | | | |
|---|---|---|---|---|
| 2008/0147566 | A1* | 6/2008 | Malik | G06Q 30/08 705/36 R |
| 2010/0185665 | A1* | 7/2010 | Horn | G06Q 10/107 707/769 |
| 2010/0293055 | A1* | 11/2010 | Nash | G06Q 30/02 705/14.55 |
| 2013/0166666 | A1 | 6/2013 | Emura | |
| 2015/0193866 | A1* | 7/2015 | Van Heerden | G06Q 40/02 705/35 |
| 2016/0314526 | A1* | 10/2016 | Gong | G06Q 30/02 |

FOREIGN PATENT DOCUMENTS

| | | |
|---|---|---|
| JP | 5145578 B2 | 2/2013 |
| WO | 2012/029702 A1 | 3/2012 |

OTHER PUBLICATIONS

Machine Translation of JP 2007-004781 A, to Matsushita, Japanese Patent Office, Jul. 12, 2018.*
Machine Translation of JP 5145578 B2, to Rakuten, Japanese Patent Office, Jul. 12, 2018.*
International Search Report of PCT/JP2014/063357, dated Aug. 5, 2014. [PCT/ISA/210] English Translation.
Written Opinion of PCT/JP2014/063357, dated Aug. 5, 2014. [PCT/ISA/237].

* cited by examiner

FIG.2

SEARCH PAGE

| SEARCH CONDITION | | |
|---|---|---|
| SEARCH KEYWORD | | |
| GOAL | | |
| SEARCH CATEGORY ← DVD → CARTOON → SPORTS → MUSIC → COMEDY | | |

| NAME | ACTION | CURRENT PRICE | TIME REMAINING |
|---|---|---|---|
| OWN GOAL COLLECTION | WATCH LIST / BID | 1,000 Yen | 1 HOUR |
| BEST SOCCER GOALS | WATCH LIST / BID | 1,200 Yen | 2 HOURS |
| BEST HOCKEY GOALS | WATCH LIST / BID | 900 Yen | 2 HOURS |

BIDING REQUEST PAGE

| NAME | OWN GOAL COLLECTION |
|---|---|
| CURRENT PRICE | 1,000 Yen |
| TIME REMAINING | 15 MINUTES 08 SECONDS |
| BID PRICE | 1,200   YEN   BID |

FIG.7

PRODUCT TABLE

| PRODUCT ID | NAME | CATEGORY ID | CATEGORY NAME |
|---|---|---|---|
| S001 | OWN GOAL COLLECTION | J001 | DVD |
| S002 | BEST SOCCER GOALS | J001 | DVD |
| S003 | BEST HOCKEY GOALS | J001 | DVD |
| ... | ... | ... | ... |
| S011 | SUMMER SWEATER | J011 | FASHION |
| ... | ... | ... | ... |

FIG.8

BIDDING PRODUCT TABLE

| PRODUCT ID | DEADLINE | NOTIFICATION DATE AND HOUR | NOTIFICATION FLAG | CURRENT PRICE | HIGHEST BIDDER ID | WATCH LIST | AUTOMATIC EXTENSION |
|---|---|---|---|---|---|---|---|
| S001 | 2014/01/01 01:00 | 2014/01/01 00:30 | NO | 1,000 Yen | U003 | U001, U003, U004 | YES |
| S002 | 2014/01/01 02:00 | 2014/01/01 01:30 | NO | 1,200 Yen | U003 | U001, U003 | NO |
| S003 | 2014/01/02 01:00 | 2014/01/02 00:30 | NO | 900 Yen | U002 | U002, U003 | NO |
| ... | ... | ... | ... | ... | ... | ... | ... |

FIG.9

PARAMETER TABLE

| SETTING PARAMETER | NUMBER OF NOTIFICATIONS | NUMBER OF ACCESSES AFTER NOTIFICATION | ACCESS RATE AFTER NOTIFICATION | TOTAL RESPONSE TIME | NUMBER OF OPEN MESSAGES AFTER DEADLINE | OPEN RATE OF MESSAGES AFTER DEADLINE |
|---|---|---|---|---|---|---|
| 30:00 | 100 | 30 | 0.30 | 300:00 | 70 | 0.70 |

FIG.10

LOG TABLE

| DATE AND HOUR | USER ID | PRODUCT ID | DETAIL |
|---|---|---|---|
| ⋮ | ⋮ | ⋮ | ⋮ |
| 2014/01/01 00:00 | U001 | S001 | RECEIVED WATCHING REQUEST |
| ⋮ | ⋮ | ⋮ | ⋮ |
| 2014/01/01 00:30 | U001, U003, U004 | S001 | SENT NOTIFICATION MAIL |
| 2014/01/01 00:40 | U001 | S001 | OPENED NOTIFICATION MAIL |
| 2014/01/01 00:41 | U003 | S001 | OPENED NOTIFICATION MAIL |
| ⋮ | ⋮ | ⋮ | ⋮ |
| 2014/01/01 00:45 | U001 | S001 | ACCESSED BIDDING REQUEST PAGE |
| ⋮ | ⋮ | ⋮ | ⋮ |

FIG.13

PARAMETER TABLE

| NOTIFICATION TIME SLOT | SETTING PARAMETER | NUMBER OF NOTIFICATIONS | NUMBER OF ACCESSES AFTER NOTIFICATION | ACCESS RATE AFTER NOTIFICATION | TOTAL RESPONSE TIME | NUMBER OF OPEN MESSAGES AFTER DEADLINE | OPEN RATE OF MESSAGES AFTER DEADLINE |
|---|---|---|---|---|---|---|---|
| 00:00 ~ 01:59 | 20:00 | 100 | 30 | 0.30 | 300:00 | 70 | 0.70 |
| 02:00 ~ 03:59 | 18:00 | 50 | 20 | 0.40 | 300:00 | 40 | 0.80 |
| ... | ... | ... | ... | ... | ... | ... | ... |
| 22:00-23:59 | 30:00 | 100 | 25 | 0.25 | 300:00 | 50 | 0.50 |

FIG.14

PARAMETER TABLE

| CATEGORY ID | SETTING PARAMETER | NUMBER OF NOTIFICATIONS | NUMBER OF ACCESSES AFTER NOTIFICATION | ACCESS RATE AFTER NOTIFICATION | TOTAL RESPONSE TIME | NUMBER OF OPEN MESSAGES AFTER DEADLINE | OPEN RATE OF MESSAGES AFTER DEADLINE |
|---|---|---|---|---|---|---|---|
| J001 | 20:00 | 100 | 30 | 0.30 | 300:00 | 70 | 0.70 |
| J002 | 18:00 | 50 | 20 | 0.40 | 300:00 | 40 | 0.80 |
| ... | ... | ... | ... | ... | ... | ... | ... |
| J003 | 30:00 | 100 | 30 | 0.30 | 300:00 | 70 | 0.70 |

FIG.15

PARAMETER TABLE

| AUTOMATIC EXTENSION | SETTING PARAMETER | NUMBER OF NOTIFICATIONS | NUMBER OF ACCESSES AFTER NOTIFICATION | ACCESS RATE AFTER NOTIFICATION | TOTAL RESPONSE TIME | NUMBER OF OPEN MESSAGES AFTER DEADLINE | OPEN RATE OF MESSAGES AFTER DEADLINE |
|---|---|---|---|---|---|---|---|
| NO | 20:00 | 100 | 30 | 0.30 | 300:00 | 70 | 0.70 |
| YES | 18:00 | 50 | 20 | 0.40 | 300:00 | 40 | 0.80 |

NOTIFYING DEVICE, PROGRAM, NON-TRANSITORY RECORDING MEDIUM, AND METHOD

CROSS REFERENCE TO RELATED APPLICATIONS

This application is a National Stage of International Application No. PCT/JP2014/063357filed May 20, 2014, the contents of all of which are incorporated herein by reference in their entirety.

TECHNICAL FIELD

The present disclosure relates to a notifying device, a program, a non-transitory recording medium, and a method.

BACKGROUND ART

Conventionally, devices are known which once notifies a user of a deadline for various transaction requests including auctions at a predetermined amount of time prior to such a deadline, and notifies the user of the next deadline at equal to or greater than a predetermined amount of time prior to the next deadline when the user accesses a request page but does not give a request (for example, Patent Literature 1).

CITATION LIST

Patent Literature

Patent Literature 1: Japanese Patent No. 5145578

SUMMARY OF INVENTION

Technical Problem

However, unless the user accesses a webpage for requesting a transaction, such as a sales page, the device disclosed in Patent Literature 1 does not adjust a notification time. Thus, the device disclosed in Patent Literature 1 has a problem that the notification is not given at an appropriate time to allow an improvement of a user's reaction level to the notification.

The present disclosure has been made in view of the aforementioned circumstances, and an objective of the present disclosure is to provide a notifying device, a program, a non-transitory recording medium, and a method which are capable of giving a notification of an approaching deadline at more appropriate time than conventional technologies.

Solution to Problem

To accomplish the above objective, a notifying device according to the first aspect of the present disclosure includes:

an obtaining unit that obtains, for each of a plurality of transactions, a notification date and hour preceding by a set time interval from a deadline for the each transaction;

a notification sending unit that sends, to a user who watches the each transaction, a notification of the deadline for the each transaction after the notification date and hour obtained for the each transaction comes;

a calculating unit that calculates a reaction level to the notifications sent by the notification sending unit for the plurality of transactions based on an action taken for the each transaction by the deadline thereof by the user to whom the notification associated with the each transaction is sent; and an updating unit that updates the time interval so as to improve the calculated reaction level.

In the notifying device of the first aspect, when the reaction level improves by tentatively changing the time interval, the updating unit may update the time interval with the tentatively changed value.

In the notifying device of the first aspect, the action may be to access a request page for the each transaction by the deadline for the each transaction, and the reaction level may be calculated so as to have a positive correlation with an access rate of the notified user.

In the notifying device of the first aspect, the action may be to access a request page for the each transaction by the deadline for the each transaction, and the reaction level may be calculated based on a response time period between a time point at which the notification is given and a time point at which the request page is accessed.

In the notifying device of the first aspect, the action may be to open the notification by the notified user after the deadline for the each transaction, and the response level may be calculated so as to have a negative correlation with an open rate after the notification.

In the notifying device of the first aspect, the time interval may be set for each time slot to which each of the deadlines for the plurality of transactions belongs.

In the notifying device of the first aspect, the time interval may be set for each category to which each of the plurality of transactions belongs.

In the notifying device of the first aspect, the time interval may be set for each transaction that has the deadline automatically extended and for transaction that has the deadline not automatically extended in the plurality of transactions.

In order to accomplish the above objective, a system according to a second aspect of the present disclosure includes:

a server that manages a plurality of transactions; and a terminal device that communicates with the server, in which:

the terminal device includes:

an obtaining unit that obtains, for each of the plurality of transactions, a notification date and hour preceding by a set time interval from a deadline for the each transaction; and a notification sending unit that sends, to a user who watches the each transaction, a notification of the deadline for the each transaction after the notification date and hour obtained for the each transaction comes;

the server includes:

a calculating unit that calculates a reaction level to the notifications sent by the notification sending unit for the plurality of transactions based on an action taken by the deadline for the each transaction for the each transaction by the user to whom the notification associated with the each transaction is sent; and an updating unit that updates the time interval so as to improve the calculated reaction level; and the terminal device obtains the updated time interval from the server.

In order to accomplish the above objective, a program according to a third aspect of the present disclosure causes a computer to function as:

an obtaining unit that obtains, for each of a plurality of transactions, a notification date and hour preceding by a set time interval from a deadline for the each transaction;

a notification sending unit that sends, to a user who watches the each transaction, a notification of the deadline for the each transaction after the notification date and hour obtained for the each transaction comes;

a calculating unit that calculates a reaction level to the notifications sent by the notification sending unit for the plurality of transactions based on an action taken for the each transaction by the deadline thereof by the user to whom the notification associated with the each transaction is sent; and an updating unit that updates the time interval so as to improve the calculated reaction level.

In order to accomplish the above objective, a non-transitory computer-readable recording medium having stored therein a program that causes a computer to function as:

an obtaining unit that obtains, for each of a plurality of transactions, a notification date and hour preceding by a set time interval from a deadline for the each transaction;

a notification sending unit that sends, to a user who watches the each transaction, a notification of the deadline for the each transaction after the notification date and hour obtained for the each transaction comes;

a calculating unit that calculates a reaction level to the notifications sent by the notification sending unit for the plurality of transactions based on an action taken for the each transaction by the deadline thereof by the user to whom the notification associated with the each transaction is sent; and an updating unit that updates the time interval so as to improve the calculated reaction level.

In order to accomplish the above objective, a method according to a fifth aspect of the present disclosure includes:

an obtaining step of obtaining, for each of a plurality of transactions, a notification date and hour that is preceding by a set time interval from a deadline for the each transaction;

a notification sending step of sending, to a user who watches the each transaction, a notification of the deadline for the each transaction after the notification date and hour obtained for the each transaction comes;

a calculating step of calculating a reaction level to the notifications sent through the notification sending step for the plurality of transactions based on an action taken for the each transaction by the deadline thereof by the user to whom the notification associated with the each transaction is sent; and an updating step of updating the time interval so as to improve the calculated reaction level.

Advantageous Effects of Invention

According to the notifying device, the program, the non-transitory recording medium, and the method of the present disclosure, it is capable of making a notification of an approaching deadline at a more appropriate time than conventional technologies.

BRIEF DESCRIPTION OF DRAWINGS

FIG. 2 is a diagram illustrating an example search page displayed by a terminal device;

FIG. 7 is a diagram illustrating an example product table stored by the notifying device;

FIG. 8 is a diagram illustrating an example bidding table stored by the notifying device;

FIG. 9 is a diagram illustrating an example parameter table stored by the notifying device according to the first embodiment;

FIG. 10 is a diagram illustrating an example log table stored by the notifying device;

FIG. 13 is a diagram illustrating an example parameter table stored by a notifying device according to a second embodiment;

FIG. 14 is a diagram illustrating an example parameter table stored by a notifying device according to a third embodiment;

FIG. 15 is a diagram illustrating an example parameter table stored by a notifying device according to a fourth embodiment;

DESCRIPTION OF EMBODIMENTS

Embodiments of the present disclosure will be described below with reference to the accompanying figures.

First Embodiment

A notifying system 1 according to a first embodiment of the present disclosure gives a notification of an approaching deadline prior to the deadline for transaction request. In this embodiment, an explanation will be given of a bidding request deadline (hereinafter, simply referred to as a bidding deadline) for the Internet auction as an example deadline for transaction request.

Figure 1:
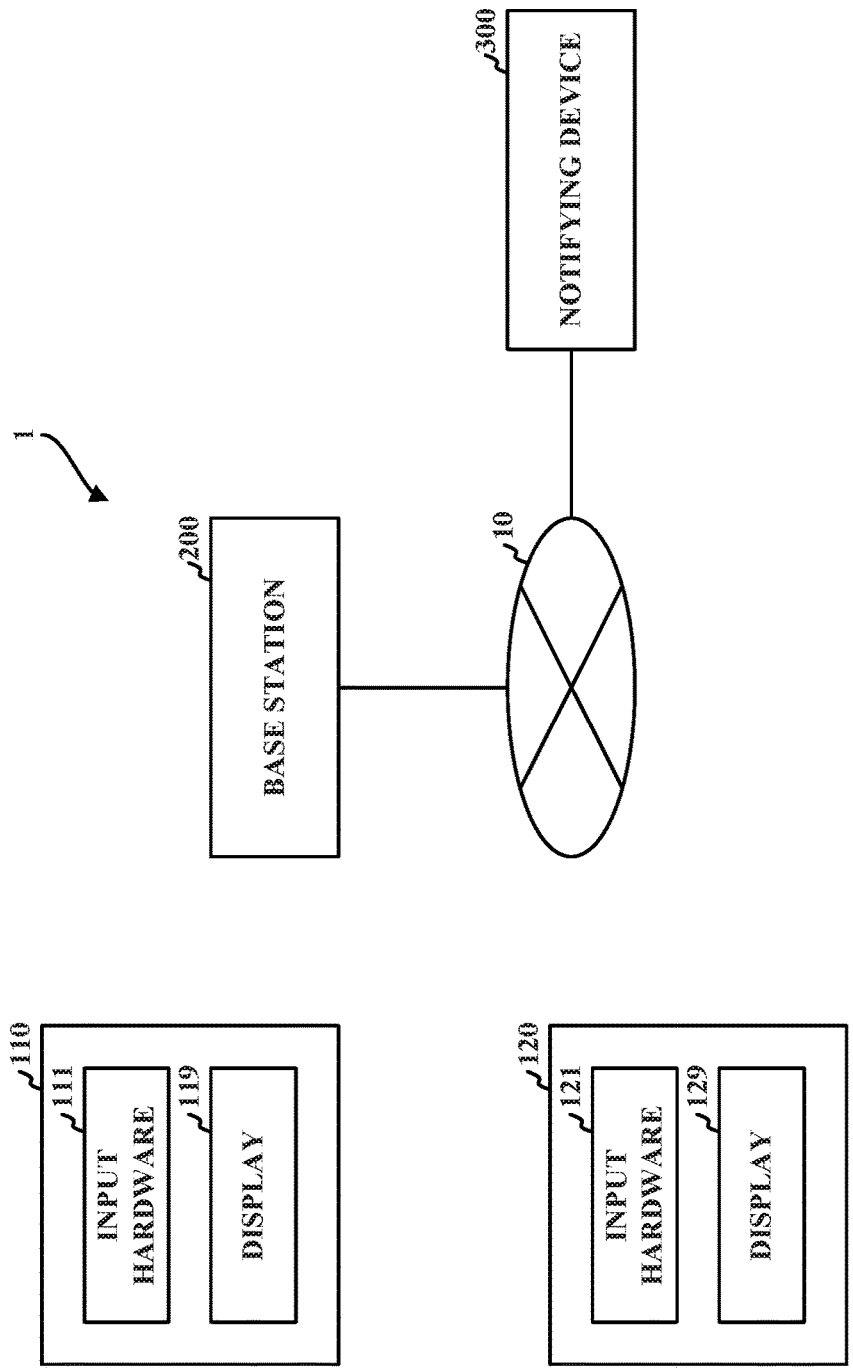
FIG. 1 is a system structure diagram illustrating an example structure of a notifying system according to a first embodiment.

The notifying system 1 includes, as illustrated in FIG. 1, terminal devices 110 and 120, a base station 200 that is wirelessly communicable with the terminal devices 110 and 120, and a notifying device 300 communicably connected with the base station 200 via a computer communication network 10 (hereinafter, simply referred to as a communication network 10).

The communication network 10 includes, for example, the Internet. The communication network 10 may be a Local Area Network (LAN) or a public line network.

The terminal devices 110 and 120 each include, for example, a mobile telephone. The terminal devices 110 and 120 each may be a laptop personal computer or a tablet computer.

The terminal device 110 includes, for example, an input hardware 111 like a touchpad, and a display 119 like a Liquid Crystal Display (LCD). The terminal device 120 includes an input hardware 121 and a display 129 both having the same structures as those of the input hardware 111 and the display 119, respectively, which are included in the terminal device 110. Since both terminal devices 110 and 120 have the same structure, and perform the same operation, the following explanation will be mainly given of the terminal device 110.

The terminal device 110 displays a search page as illustrated in FIG. 2 which is used to search a product that can be bid on in the Internet auction. When the input hardware 111 is operated by a user, the terminal device 110 inputs a search condition of a product in accordance with the given operation, and transmits, to the notifying device 300, data (hereinafter, referred to as search condition data) representing the input search condition, and a search request.

Subsequently, the terminal device 110 obtains, from the notifying device 300, information on a name of the product, a current price, and a bidding deadline which satisfy the search condition, and displays the obtained information in the search page. Thereafter, the user who has checked the display 119 determines a product (hereinafter, referred to as a watching product) for watching a transaction.

In this case, watching a transaction means receiving a report on changes in a transaction status. This report is provided to a user whose identification information (hereinafter, referred to as a user ID) is registered in a list so-called a watch list stored by the notifying device 300. Accordingly, the user who watches a transaction is also referred to as a user registered in the watch list.

The report on changes in transaction status includes a notification of an approaching deadline for transaction request, but the report on changes in transaction status is not limited to this particular form, and in the case of the bidding transaction, the report includes, for example, a change in the highest bid price, and a change of the user (hereinafter, referred to as the highest bidder) bidding on with the highest price to another user.

Next, the user gives an operation and the like to the input hardware 111 like a selection of a product to be watched, and the terminal device 110 inputs, through the input hardware 111 in accordance with the given operation, information (hereinafter, referred to as a watching product ID) that identifies a product that is subjected to watching, and the user ID. Subsequently, the terminal device 110 transmits, to the notifying device 300, the watching product ID, the user ID, and a watch request that requests a registration of the user ID in the watch list.

Figure 3:
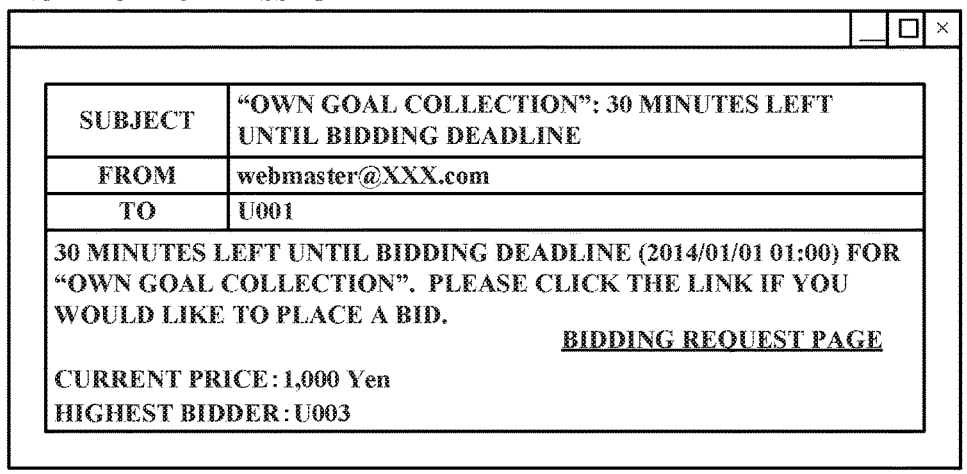
FIG. 3 is a diagram illustrating an example notification message displayed by the terminal device.

Next, when the bidding deadline approaches for the watching product, the terminal device 110 receives, from the notifying device 300, a message (hereinafter, referred to as a notification message) as illustrated in FIG. 3 which notifies the user of the approaching bidding deadline, and displays the received message on the display 119.

The notification message displayed on the display 119 contains a request deadline, a name of the product with which the request deadline is approaching, and a current price of the product. When the user who has checked the display 119 decides to bid on the product based on the displayed information, the user gives an operation and the like to the input hardware 111 to display a page (hereinafter, referred to as a bidding request page) used for a bidding request to the product. The terminal device 110 inputs, through the input hardware 111 in accordance with the given operation, information (hereinafter, referred to as a bidding product ID) that identifies the product (hereinafter, referred to as a bidding product) to bid on. Next, the terminal device 110 transmits, to the notifying device 300, a transmission request to request a transmission of the bidding request page, the input bidding product ID, and the user ID.

Figure 4:
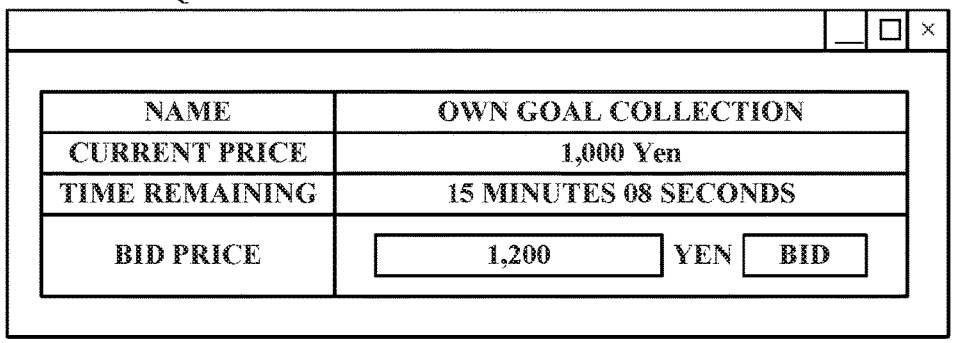
FIG. 4 is a diagram illustrating an example bidding request page displayed by the terminal device.

Subsequently, the terminal device 110 obtains, from the notifying device 300, the bidding request page as illustrated in FIG. 4, and displays the bidding request page on the display 119. Next, the terminal device 110 transmits, to the notifying device 300, information indicating the bid price that has been input through the input hardware 111 in accordance with the user operation to make a bidding request.

Note that in this embodiment, the explanation was given of an example case in which the user gives, to the input hardware 111, the operation to select the product to be watched after checking the search result. However, the operation to select the product to bid on may be given without selecting the product to be watched. In this case, as will be discussed later, the user receives the notification of approaching bidding deadline because the user ID of the user is registered in the watch list.

Returning to FIG. 1, the explanation for the notifying system will be given again. The base station 200 is, for example, a base station for mobile telephones, or a base station for a wireless LAN. The base station 200 relays a communication between the terminal devices 110, 120 and the notifying device 300.

Figure 5:
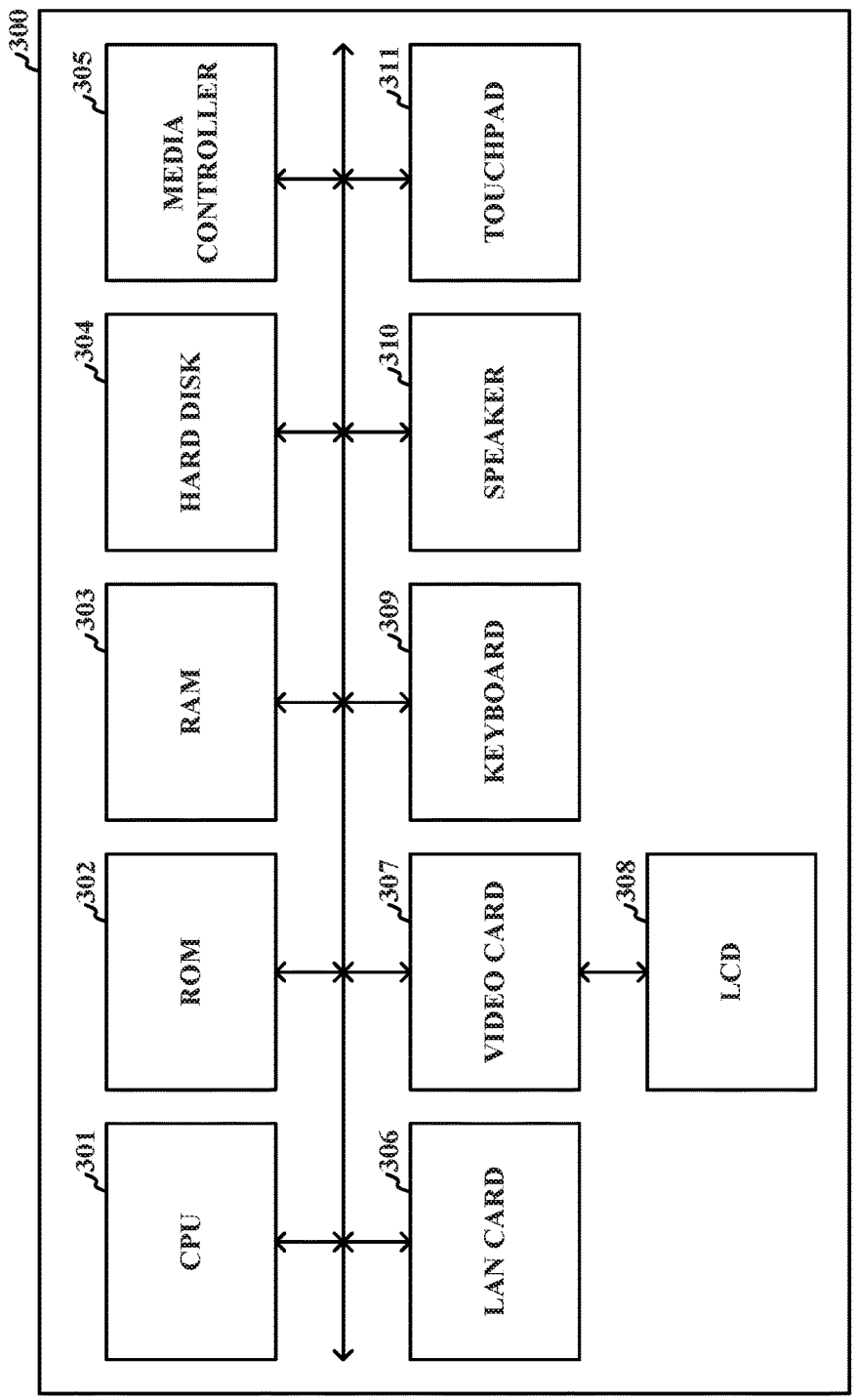
FIG. 5 is a hardware structure diagram illustrating an example notifying device.

The notifying device 300 includes a server device as illustrated in FIG. 5. The notifying device 300 includes a Central Processing Unit (CPU) 301, a Read Only Memory (ROM) 302, a Random Access Memory (RAM) 303, a hard disk 304, a media controller 305, a Local Area Network (LAN) card 306, a video card 307, a Liquid Crystal Display (LCD) 308, a keyboard 309, a speaker 310, and a touchpad 311.

The CPU 301 controls the whole notifying device 300 by executing programs in accordance with programs stored in the ROM 302 or the hard disk 304. The RAM 303 is a work memory that temporarily stores data subjected to processes when the CPU 301 executes programs.

The hard disk 304 is an information memory that stores a table that stores various data.

The media controller 305 reads various data and programs from a non-transitory recording medium, such as a flash memory, a Compact Disc (CD), a Digital Versatile Disc (DVD), and a Blu-ray Disc (Blu-ray Disc) (registered trademark).

The LAN card 306 exchanges data between the terminal devices 110 and 120 that are connected via the communication network 10 and the base station 200. The keyboard 309 and the touchpad 311 input a signal in accordance with the user operation.

The video card 307 depicts (that is, renders) an image based on digital signals that are output by the CPU 301, and outputs image signals representing the depicted image. The LCD 308 displays an image according to the image signals that are output by the video card 307. Note that the notifying device 300 may include a Plasma Display Panel (PDP) or Electro Luminescence (EL) display instead of the LCD 308. The speaker 310 outputs sounds based on signals that are output by the CPU 301.

Next, functions of the notifying device 300 will be described.

Figure 6:
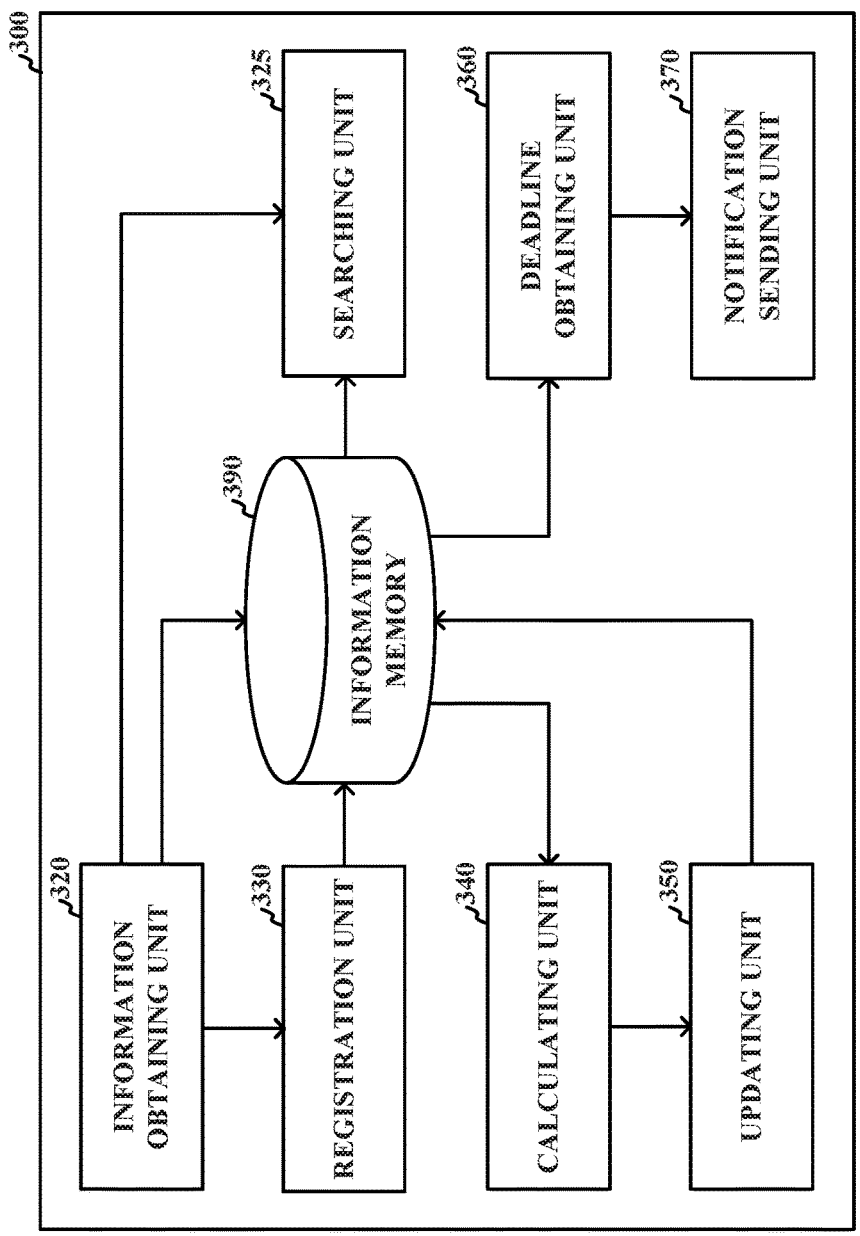
FIG. 6 is a functional block diagram illustrating example functions of the notifying device.

The hard disk 304 illustrated in FIG. 5 works together with the CPU 301 to function as an information memory 390 illustrated in FIG. 6.

The information memory 390 stores a product table as illustrated in FIG. 7. The product table stores multiple records associated with pieces of information that are information (hereinafter, referred to as a product ID) for identifying a product put up in the auction, information indicating a product name, information for identifying a category of a product, and information indicating a category name.

The category of product means a kind of product, and any product put up in the auction is classified in any one of the kinds (that is, categories). Example categories are "fashion" to which products, such as clothing, are classified, and "Digital Versatile Disc (DVD)" to which DVDs that record video images like movies, and television programs, and music are classified.

In addition, the information memory 390 stores a bidding table as illustrated in FIG. 8. The bidding table stores multiple records associated with pieces of information that are the product ID stored in the product table in FIG. 7, information indicating the bidding deadline for the product identified with the product ID, information indicating a date and hour (hereinafter, referred to as a notification date and hour) for notifying the approaching deadline, a notification flag indicating whether or not a notification has been sent, information indicating the current price of the product, the user ID of the highest bidder, a watch list of the product, and information indicating whether or not there is an automatic extension of bidding. The automatic extension of bidding will be explained in a second embodiment.

Still further, the information memory 390 stores a parameter table as illustrated in FIG. 9 which stores parameters (hereinafter, simply referred to as a setting parameter) that specify the notification date and hour. The parameter table stores a record associated with pieces of information used to update the setting parameters that are information indicating the number of notifications, information indicating the number of accesses after the notification, information indicating an access rate after the notification, information indicating a total response time, information indicating the number of open messages after the deadline, and information indicating an open rate of messages after the deadline.

The number of notifications is how many times the notifications of the approaching bidding deadlines have been made by the notifying device 300. The number of accesses after the notification is a number that counts the accesses made by the notified user during the time period after the notification to the deadline among a total number of accesses to the bidding request page of the product for which the notification of approaching bidding deadline has been made. The access rate after the notification is a rate of the access number made after the notification relative to the number of notifications.

In this embodiment, the notifying device 300 sends an e-mail (hereinafter, referred to as a notification mail) containing a notification message to notify the user of an approaching bidding deadline. Accordingly, the response time is a time between after the notification mail is transmitted and until the access is made when the user who has checked the notification mail accesses the bidding request page for the product subjected to the notification of approaching bidding deadline within the time period after the notification and to the deadline.

The total response time is a total of response times for the user to whom the notification mail is sent. The number of open messages after the deadline is a number of users who have opened the notification mails after the bidding deadline notified by the notification mail. The open rate of messages after the deadline is a rate of the number of open messages after the deadline relative to the number of notifications.

In addition, the information memory 390 stores a log table as illustrated in FIG. 10 which stores logs applied to count the number of accesses, and the like. The log table stores multiple records associated with pieces of information that are information on a date and hour of being stored indicating a date and hour at which a log is stored, detail information indicating details of a log, the user ID relevant to the log details, and the product ID.

An explanation will be further given of the functions of the notifying device 300.

When the LAN card 306 receives the search request from the terminal device 110, the CPU 301 in FIG. 5 starts executing a searching process for searching a product. The CPU 301 functions as an information obtaining unit 320 and a searching unit 325 as illustrated in FIG. 6 by executing the searching process.

When the searching process starts, the information obtaining unit 320 obtains, from the LAN card 306 illustrated in FIG. 5, the search condition data received from the terminal device 110. Subsequently, the searching unit 325 extracts, from the search condition data, a search keyword, and a category ID of a category to which the product subjected to the searching belongs. Thereafter, the searching unit 325 searches, from the product table in FIG. 7, multiple product IDs that match the extracted category ID, and, information indicating the product name that partially or completely matches the search keyword. Subsequently, the searching unit 325 searches, from the bidding table in FIG. 8, pieces of information indicating the deadlines associated with the respective searched multiple product IDs, and the information indicating the current prices.

Next, the searching unit 325 outputs, to the LAN card 306 with a destination address being as the terminal device 110, the searched product ID, the information indicating the product name, the information indicating the deadline, and the information indicating the current price. The LAN card 306 transmits these pieces of information to the terminal device 110, and the terminal device 110 displays these pieces of information in the search page of FIG. 2.

The user of the terminal device 110 checks the search page, and determines a product to be watched among the multiple searched products. The terminal device 110 transmits, to the notifying device 300 in accordance with the user operation, the user ID, the watching product ID, and the watch request to request a registration of the user in the watch list for the watching product.

Figure 11:
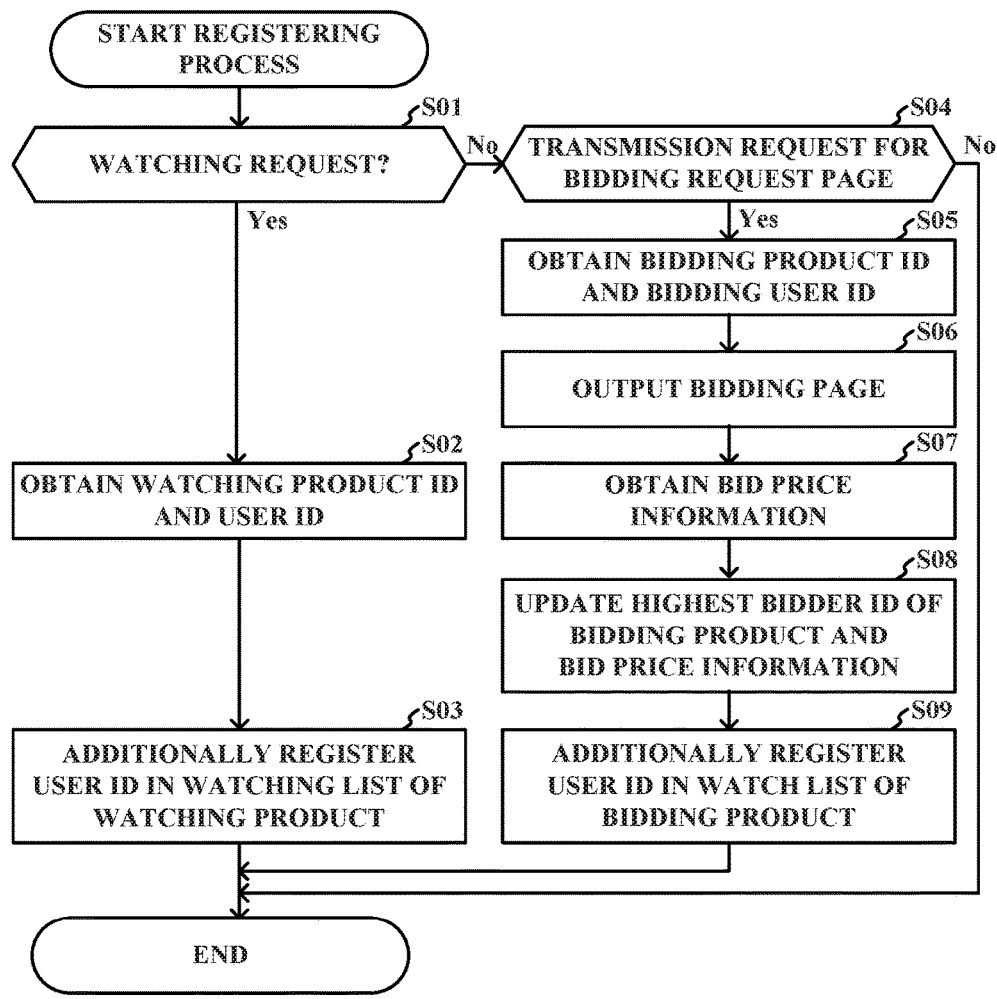
FIG. 11 is a flowchart illustrating an example registering process executed by the notifying device.

Next, when the LAN card 306 receives the watch request from the terminal device 110, the CPU 301 starts executing a registering process as illustrated in FIG. 11. The CPU 301 functions as a registration unit 330 by executing the registering process in addition to be functioning as the information obtaining unit 320 illustrated in FIG. 6.

When the execution of the registering process starts, the information obtaining unit 320 obtains a request from the LAN card 306, and after determining that the obtained request is the watch request (step S01: YES), the information obtaining unit obtains (step S02) the user ID and the watching product ID from the LAN card 306. Next, the registration unit 330 additionally registers (step S03) the obtained user ID in the watch list (that is, the watch list for the watching product) that is associated with the same product ID as that of the watching product ID in the bidding table in FIG. 8. Subsequently, the registration unit 330 terminates the execution of the registering process.

When the user of the terminal device 110 checks the search page of FIG. 2, and determines, not a product to be watched but a product to bid on, the terminal device 110 transmits, to the notifying device 300 in accordance with the user operation, the bidding product ID, the user ID, and the transmission request for the bidding request page. Subsequently, when the LAN card 306 receives the transmission request, the CPU 301 starts the registering process in FIG. 11 which has been partly explained above.

When the execution of the registering process starts, the information obtaining unit 320 obtains the request from the LAN card 306, and after determining that the obtained request is not the watch request (step S01: NO), the information obtaining unit determines that the obtained request is the transmission request (step S04: YES). Note that when determining that the obtained request is not the transmission request (step S04: NO), the information obtaining unit 320 terminates the execution of the registering process.

Next, after the information obtaining unit 320 obtains (step S05) the bidding product ID and the user ID from the LAN card 306, the registration unit 330 outputs (step S06), to the LAN card 306 with a destination address being as the terminal device 110, the bidding request page that is identified by the obtained bidding product ID.

Subsequently, the registration unit 330 associates one another the user ID, the bidding product ID, detail information indicating a detail such that the user who is identified by this user ID has accessed the bidding request page for the product identified by the bidding product ID, and the information on the date and hour at which the log is stored, and stores these associated pieces of information in the log table in FIG. 10. Note that the registration unit 330 may contain information indicating a date and hour of access to the bidding request page as the information on the date and hour at which the log is stored.

Next, the LAN card 306 transmits the bidding request page to the terminal device 110, and the terminal device 110 displays the bidding request page. The user of the terminal device 110 checks the bidding request page, and determines a bid price. The terminal device 110 transmits, to the notifying device 300 in accordance with the user operation, information indicating the bid price.

Subsequently, the information obtaining unit 320 obtains (step S07), from the LAN card 306, information indicating the bid price. Next, the registration unit 330 updates (step S08) the user ID of the highest bidder, and the information indicating the current price both are associated with the product ID that is the same as the bidding product ID stored in the bidding table in FIG. 8 by the obtained user ID and information indicating the bid price.

Next, the registration unit 330 associates one another the user ID, the bidding product ID, the detail information indicating the detail such that the user who is identified by this user ID has bid on the product identified by the bidding product ID, and the information on the date and hour at which the log is stored, and stores these pieces of information in the log table in FIG. 10. Note that the registration unit 330 may store information indicating the bidding date and hour as the information on date and hour at which the log is stored.

Next, when the obtained user ID is not contained in the watch list (that is, the watch list for the bidding product) associated with the product ID that is the same as the bidding product ID, the registration unit 330 additionally registers (step S09) this user ID in this watch list. Subsequently, the registration unit 330 terminates the execution of the registering process.

Figure 12:
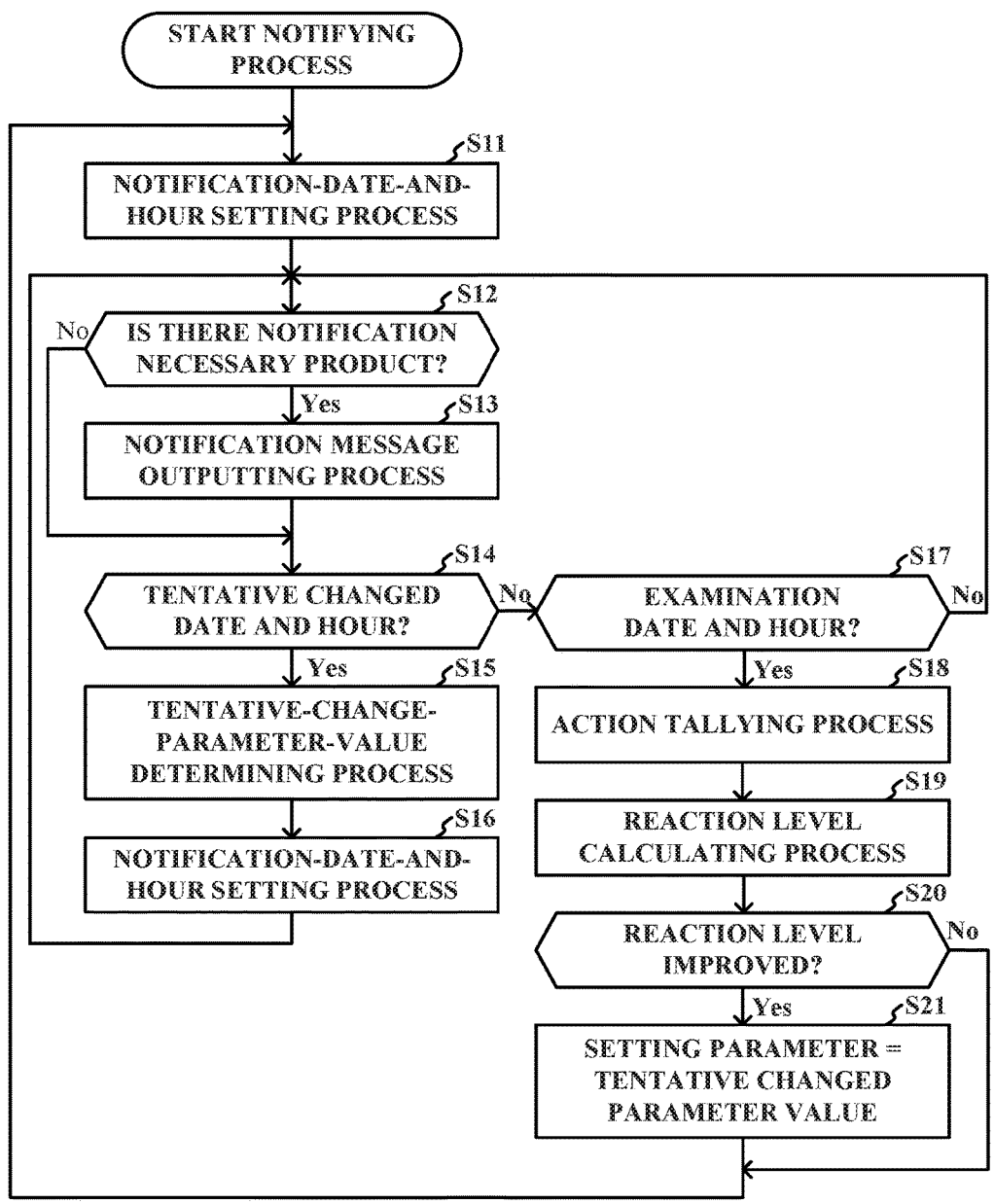
FIG. 12 is a flowchart illustrating an example notifying process executed by the notifying device.

When the power is turned on, the CPU 301 in FIG. 5 starts executing a notifying process illustrated in FIG. 12. The notifying process is a process of notifying the user who is registered in the watch list of the approaching bidding deadline. Through the execution of this process, the CPU 301 functions as a calculating unit 340, an updating unit 350, a deadline obtaining unit 360, and a notification sending unit 370 as illustrated in FIG. 6.

When the execution of the notifying process starts, a notification-date-and-hour setting process for setting a notification date and hour is executed (step S11) for the product with the product ID stored in the bidding table in FIG. 8.

When the notification-date-and-hour setting process starts, the calculating unit 340 obtains a setting parameter stored in the parameter table in FIG. 9. Next, the deadline obtaining unit 360 obtains, from each of the multiple records stored in the bidding table in FIG. 8, information indicating the bidding deadline. Thereafter, the calculating unit 340 calculates the date and hour that are advanced from the bidding deadlines respectively indicated by the obtained multiple pieces of information by an amount of time represented by the setting parameter as the notification date and hour. In this embodiment, an explanation will be given of an example case in which the setting parameter is set to be 30 minutes as a default value. However, the setting parameter is not limited to this number.

Next, for each of the notification dates and times that have been calculated, the updating unit 350 updates information indicating the bidding deadline used in the calculation, and each piece of information indicating the notification dates and times associated in the bidding table by the information indicating the calculated notification date and hour.

Subsequently, the updating unit 350 sets a date and hour (hereinafter, referred to as a tentative changed date and hour) to tentatively change the notification date and hour to a date and hour that is delayed by a predetermined amount of time. This is because to adjust a notification timing to an appropriate time period. In addition, the updating unit 350 sets the date and hour (hereinafter, referred to as an examination date and hour) to examine how much the user has reacted to the notification mail by changing the notification timing (hereinafter, referred to as a reaction level) to a date and hour that is delayed from the tentative changed date and hour of by a predetermined amount of time. Subsequently, the updating unit 350 terminates the execution of the notification-date-and-hour setting process.

Subsequent to the step S11, the notification sending unit 370 determines (step S12), after obtaining the current date and hour from, for example, an Operating System (OS), whether or not there is a product (hereinafter, referred to as a notification necessary product) for which the notification of approaching bidding deadline is necessary.

In this case, the product with the deadline to be notified is a product that has the notification date and hour approaching, but has the notification of the deadline not yet made. Thus, the notification sending unit 370 searches, from the bidding table in FIG. 8, a record that stores a notification flag indicating that the notification has not been made yet, and information indicating the notification date and hour prior to the current date and hour, record by record. Subsequently, the notification sending unit 370 determines that the product identified by the product ID stored in the searched record is the notification necessary product.

When determining that there is the notification necessary product (step S12: YES), the notification sending unit 370 executes (step 13) a notification message outputting process of outputting the notification message.

When starting the notification message outputting process, the notification sending unit 370 obtains, from the bidding table, for example, information indicating the bidding deadline, information indicating the current price, and information indicating the highest bidder which are associated with the product ID of the notification necessary product, and creates the notification message containing these pieces of obtained information.

Subsequently, the notification sending unit 370 obtains, from the bidding table, a watch list associated with the product ID of the notification necessary product. In this embodiment, the explanation will be given of an example case in which the user ID is a user's e-mail address. Accordingly, the notification sending unit 370 creates notification mails that contain the notification message with the multiple user IDs that are registered in the obtained watch list being as destination addresses, and outputs the notification mails to the LAN card 306 in FIG. 5.

Next, after the LAN card 306 completes the transmission of the notification mails, the notification sending unit 370 creates detail information indicating that the notification mail that shows the bidding deadline for the notification necessary product has been transmitted to the multiple users who are registered in the watch list. Subsequently, the notification sending unit 370 stores, in the log table in FIG. 10, the user ID of each of these multiple users, the product ID of the notification necessary product, the created detail information, and the information on date and hour at which the log is stored in association with one another. Next, the notification sending unit 370 terminates the execution of the notification message outputting process. Note that the registration unit 330 may store information indicating the transmission date and hour of the notification mail as the information on date and hour at which the log is stored.

Note that the notification mail has a setting that, when the notification mail is opened at the terminal device 110, an e-mail (hereinafter, referred to as an open confirmation mail) reporting that the message has been opened is returned to the sending unit. This open confirmation mail shows the product ID of the product for which the deadline has been notified, and the user ID of the notified user. Accordingly, when the LAN card 306 receives the open confirmation mail, the information obtaining unit 320 obtains the open confirmation mail from the LAN card 306, and the registration unit 330 stores, in the log table, the product ID and the user ID shown in the open confirmation mail, the detail information indicating that the notification mail has been opened, and the information on date and hour at which the log is stored in association with one another. Note that, the registration unit 330 may store information indicating an open date and hour of the notification mail, and a date and hour at which the open confirmation mail was received as the information on date and hour at which the log is stored.

When the reporter determines that there is no notification necessary product (step S12: NO), or after executing the step S13, the calculating unit 340 obtains the current date and hour. Next, the calculating unit 340 determines (step S14), based on whether or not the current date and hour is the later time than the tentative changed date and hour of the setting parameter, whether or not the tentative changed date and hour has approached.

In this case, when the calculating unit 340 determines that the tentative changed date and hour has approached (step S14: YES), the updating unit 350 executes (step S15) a tentative-change-parameter-value determining process of determining a value of the setting parameter that is tentatively changed. At this time, the updating unit 350 determines at random whether the current value of the setting parameter should be increased by a predetermined value or decreased by a predetermined value.

Subsequently, the notification-date-and-hour setting process is executed (step S16) using the tentative changed value of the setting parameter. The notification-date-and-hour setting process executed in the step S16 is the same process as the notification-date-and-hour setting process executed in the step S11. When the notification-date-and-hour setting process starts in the step S16, the deadline obtaining unit 360 obtains the information indicating the bidding deadline from each of the multiple records stored in the bidding table in FIG. 8, and calculates, as the notification date and hour, the date and hour that is advanced from the bidding deadlines indicated by the obtained multiple pieces of information by an amount of time represented by the tentative changed value of the setting parameter.

Next, for each of the calculated notification dates and times, the updating unit 350 updates information indicating the notification date and hour associated with each piece of information indicating the bidding deadline applied for the calculation by the information indicating the calculated notification date and hour. Subsequently, the execution of the notification-date-and-hour setting process is terminated. Thereafter, the aforementioned processes from the step S12 are repeated.

In the step S14, when determining that there is no approaching tentative changed date and hour (step S14: NO), the calculating unit 340 determines (step S17), based on whether or not the current date and hour is the later time than the examination date and hour, whether or not the examination date and hour has approached. In this case, when determining that the examination date and hour has approached (step S17: YES), the calculating unit 340 executes (step S18) an action tallying process of tallying the log data that records the user's action to the notification of the bidding deadline.

When the action tallying process starts, the calculating unit 340 calculates the number of notifications, the number of accesses after the notification, the access rate after the notification, the total value of response times, the number of open messages after the deadline, and the open rate of messages after the deadline.

First, an example calculation scheme of the number of notifications will be explained. The calculating unit 340 counts, in the log table in FIG. 10, the number of user IDs associated with the detail information (hereinafter, referred to as transmission detail information) indicating a detail that the notification mail has been transmitted. Through this operation, the calculating unit 340 calculates the number of transmitted notification mails, and has this calculated number of transmissions as the number of notifications.

Next, example calculation schemes of the number of accesses after the notification, the access rate after the notification, the response time, and the total value of response times will be explained. The calculating unit 340 obtains, from the log table in FIG. 10, multiple sets of the transmission detail information, and information on the storing date and hour, the product ID, and the multiple user IDs which are associated with the transmission detail information. Accordingly, the calculating unit 340 specifies the multiple sets of the transmission date and hour of the notification mail, the product for which the notification of the bidding deadline has been made, and the multiple notified users.

Next, the calculating unit 340 focuses on one of the multiple specified sets, and sets this focused set as a focused set. In addition, the calculating unit 340 sets the transmission date and hour, the product, and the multiple users forming this focused set as a focused transmission date and hour, a focused product, and multiple focused users, respectively.

Subsequently, the calculating unit 340 obtains, from the bidding table in FIG. 8, the information indicating the bidding deadline associated with the product ID of the focused product. Next, the calculating unit 340 obtains multiple pieces of detail information indicating the access to the bidding request page among the pieces of detail information associated with the information on storing date and hour indicating the time from the focused transmission date and hour and to the date and hour of the bidding deadline for the focused product, the product ID of the focused product, and any one of the user IDs of the multiple focused users. This is because to obtain the detail information indicating that the user notified of the focused product has accessed the bidding request page for the focused product by the bidding deadline for the focused product after the focused transmission date and hour.

Next, the calculating unit 340 counts the number of pieces of obtained detail information. This is because to calculate the number of accesses to the bidding request page for the focused product by any one of the multiple focused users who has been notified of the focused product after the transmission of the notification mail and until the bidding deadline.

In addition, the calculating unit 340 sets, as the response time, a time represented by a difference between the storing date and hour (that is, the access date and hour) indicated by each of the pieces of information respectively associated with the obtained multiple pieces of detail information, and the focused transmission date and hour. This is to calculate a time needed for any one of the multiple focused user who has reacted to the notification to access the bidding request page after the notification of the focused product and before the bidding deadline.

Next, after repeating the aforementioned processes until there is no more focused set, the calculating unit 340 totals the number of pieces of detail information that are counted set by set, and calculates the number of accesses after the notification. Thereafter, the calculating unit 340 divides the number of accesses after the notification by the number of notifications to calculate the access rate after the notification. In addition, the calculating unit 340 totals the multiple response times that have been calculated set by set to calculate the total value of response times.

Next, an explanation will be given of example calculation schemes of the number of open messages after the deadline, and the open rate of messages after the deadline. Likewise the calculation of the number of accesses after the notification, the calculating unit 340 specifies multiple sets of the product for which the notification of the bidding deadline has been made, and each of the multiple notified users. Subsequently, the calculating unit 340 focuses on one of the multiple specified sets, and sets the product and the multiple users forming the focused set as the focused product and the multiple focused users.

Next, the calculating unit 340 obtains, from the bidding table in FIG. 8, information indicating the bidding deadline associated with the product ID of the focused product, obtains multiple pieces of detail information indicating that the notification mail has been opened among the pieces of detail information associated with the information on storing date and hour indicating the date and hour that is the later time than the bidding deadline, the product ID of the focused product, and any of the user IDs of the multiple focused users, and, counts the number of pieces of obtained detail information. Thereafter, the calculating unit 340 repeats the aforementioned processes until there is no more focused set, and sets a value obtained by totaling the number of pieces of detail information counted set by set as the number of open messages after the deadline. Next, the calculating unit 340 divides the number of open messages after the deadline by the number of notifications to calculate the open rate of messages after the deadline.

After the calculating unit 340 completes the calculation of the number of notifications, the access rate after the notification, the total value of response times, and the open rate of messages after the deadline, the updating unit 350 updates respective pieces of information stored in the parameter table in FIG. 9 with the pieces of information indicating these calculated values. Subsequently, the updating unit 350 terminates the execution of the action tallying process.

After the step S18 in FIG. 12 is executed, the updating unit 350 stores the latest reaction level in a stored parameter that stores the latest value of the reaction level indicating how much the user has reacted to the notification mail. Note that when the reaction level has never been calculated at all, the updating unit 350 stores the lowest value of the reaction level for the stored parameter.

Next, the calculating unit 340 executes (step S19) a reaction level calculating process of calculating the reaction level based on the access rate after the notification, the total value of response times, and the open rate of messages after the deadline all calculated in the action tallying process in the step S18.

The calculating unit 340 calculates the reaction level that has a positive correlation with the access rate after the notification, a negative correlation with the total value of response times, and a negative correlation with the open rate of messages after the deadline. The greater the user's reaction to the notification mail is, the greater the reaction level to be calculated by the calculating unit 340 becomes. A suitable calculation formula applied to calculate the reaction level by the calculating unit 340 can be set by a person skilled in the art based on the setting.

Next, the updating unit 350 determines (step S20), based on whether or not the latest reaction level calculated in the step S19 is greater than the last reaction level stored in the stored parameter, whether or not the reaction level has improved. At this time, when determining that the reaction level has improved (step S20: YES), the updating unit 350 updates (step S21) the value of the setting parameter stored in the parameter table in FIG. 9 with the tentative changed value.

When determining that the reaction level has not improved (step S20: NO), or after the step S21, the aforementioned processes from the step S11 are repeated.

According to those structures, the notifying device 300 updates the time interval between the notification date and hour and the request deadline so as to improve the reaction level that is calculated based on the actions taken by the user who has notified of the deadline before the deadline. Thus, the notification can be made at an appropriate time period that can improve the reaction level of the user in comparison with conventional technologies. Since the notification is made at an appropriate time period, the present disclosure can surely prevent, in comparison with conventional technologies, the user from forgetting to make a request for bidding due to a too long grace between the notification and the deadline, and also prevent the user from missing the bidding deadline due to a too short grace.

According to those structures, the notifying device 300 updates the time interval with the tentative changed value thereof if the reaction level is improved by tentatively changing the time interval between the notification date and hour and the request deadline. Thus, the notification of approaching deadline can be made at more appropriate time period even if it is unclear as to whether a failure to notify at an appropriate timing is due to a too short or too long time interval between the notification date and hour and the deadline.

According to those structures, the notifying device 300 updates the time interval between the notification date and hour and the request deadline so as to improve the reaction level having the negative correlation with the open rate of messages after the deadline. Thus, the number of users who will open the notification mail prior to the approaching deadline increases in comparison with conventional technologies, thereby improving the number of accesses by the users to the bidding request page in comparison with conventional technologies.

According to those structures, the notifying device 300 updates the time interval between the notification date and hour and the deadline so as to improve the reaction level having the negative correlation with the response time period. Thus, the response time period becomes short in comparison with conventional technologies, thereby surely preventing, in comparison with conventional technologies, the user from forgetting to access the bidding request page after receiving the notification.

According to those structures, the notifying device 300 updates the time interval between the notification date and hour and the deadline so as to improve the reaction level having the positive correlation with the access rate after the notification. Thus, the number of accesses to the bidding request page prior to the deadline increases in comparison with conventional technologies, thereby prompting more active transactions.

Second Embodiment

In the first embodiment, the explanation was given of an example case in which the notifying device 300 determines the notification date and hour using the same setting parameter regardless of the time slot to which the bidding deadline belongs. In this embodiment, the notifying device 300 determines the notification date and hour using a parameter with a value that is set time slot by time slot to which the bidding deadline belongs. Since the notifying device 300 according to this embodiment has the same structures and functions as those of the notifying device 300 in the first embodiment, the following explanation will be mainly given of differences from the first embodiment.

First, an explanation will be given of a difference in the table stored in the information memory 390 in FIG. 6. The information memory 390 stores a parameter table as illustrated in FIG. 13 instead of the parameter table in FIG. 9. The parameter table in FIG. 13 stores multiple records associated with pieces of information that are, for example, information indicating a predetermined time slot, a setting parameter for setting the notification date and hour of the deadline that belongs to this time slot, and the number of notifications applied to update this setting parameter.

Next, an explanation will be given of a difference in the notifying process that utilizes the parameter table.

Through the notification-date-and-hour setting process in the step S11 of the notifying process in FIG. 12, the calculating unit 340 in FIG. 6 obtains the pieces of information indicating the respective bidding deadlines from the multiple records stored in the bidding table in FIG. 8. Subsequently, for each of the bidding deadlines indicated by the obtained multiple pieces of information, the calculating unit obtains, from the parameter table in FIG. 13, the setting parameter associated with the information indicating the time slot to which the bidding deadline belongs. Next, the calculating unit 340 calculates the date and hour, as the notification date and hour, that is advanced from the bidding deadline indicated by each of the obtained multiple pieces of information by an amount of time represented by the setting parameter for the time slot to which the deadline belongs.

Thereafter, the same processes from the step S12 to the step S14 in FIG. 12 as the first embodiment are executed. Next, in the tentative-change-parameter-value determining process in the step S15, the updating unit 350 in FIG. 6 determines the tentative changed value of the setting value for each of the multiple setting parameters stored in the parameter table in FIG. 13.

Subsequently, the same processes from the step S16 to the step S17 in FIG. 12 as the first embodiment are executed. Next, in the action tallying process in the step S18, the calculating unit 340 calculates, from the data stored in the log table in FIG. 10, numerical values that are applied to update the setting parameter for each time slot. That is, the calculating unit 340 calculates, for each of the multiple time slots indicated by pieces of the information stored in the parameter table in FIG. 13, the number of notifications in the time slot, the access rate after the notification, the total value of response times, and the open rate of messages after the deadline.

Subsequently, in the step S19, the calculating unit 340 calculates the reaction level for each time slot based on the access rate after the notification, the total value of response times, and the open rate of messages after the deadline all calculated for each of the multiple time slots. Next, in the step S20, the updating unit 350 determines, for each of the multiple time slots, whether or not the reaction level has improved. At this time, the updating unit 350 updates the setting parameter of the time slot which has been determined that the reaction level has improved with the tentative changed value. Thereafter, the aforementioned processes from the step S11 are repeated.

In this case since a lifestyle pattern of the user differs time slot by time slot, how the user reacts to the notification often varies. For example, a reaction speed in a time slot from midnight 11:00 to 11:59 is often faster than the reaction speed in a time slot from 10:00 A.M. to 6:00 P.M. This is because many users are doing housework or their work during the time slot from 10:00 A.M. to 6 P.M. Thus, according to those structures, the notifying device 300 sets the time interval between the notification date and hour and the request deadline time slot by time slot to which each of the multiple transaction deadlines belongs, thereby giving the notification at a more appropriate time period in accordance with the time slot in comparison with conventional technologies.

Third Embodiment

In the first embodiment, the explanation was given of an example case in which the notifying device 300 determines the notification date and hour using the same setting parameter regardless of the category to which the product belongs. In this embodiment, the notifying device 300 determines the notification date and hour using a parameter with a value that is set category by category to which the product belongs. Since the notifying device 300 according to this embodiment has the same structures and functions as those of the notifying device 300 in the first embodiment, the following explanation will be mainly given of differences from the first embodiment.

First, an explanation will be given of a difference in the table stored in the information memory 390 of the notifying device 300 illustrated in FIG. 6. The information memory 390 stores a parameter table as illustrated in FIG. 14 instead of the parameter table in FIG. 9. The parameter table in FIG. 14 stores multiple records associated with pieces of information that are, for example, a category ID, a setting parameter for setting the notification date and hour of the deadline for the product that belongs to this category ID, and the number of notifications applied to update the setting parameter.

Next, an explanation will be given of a difference in the notifying process that utilizes the parameter table.

In the notification-date-and-hour setting process in the step S11 of the notifying process in FIG. 12, the calculating unit 340 in FIG. 6 calculates the notification date and hour of each of the multiple bidding deadlines indicated by pieces of the information stored in the bidding table in FIG. 8. In this case, the calculating unit 340 sets, as the notification date and hour, the date and hour that is advanced from the bidding deadlines by an amount of time indicated by the setting parameter that is set for each category of the product subjected to the notification of the deadline.

In addition, in the tentative-change-parameter-value determining process in the step S15, the updating unit 350 in FIG. 6 determines, category by category of the product, a value that is the tentatively changed setting parameter value.

Next, in the action tallying process in the step S18, the calculating unit 340 calculates, category by category of the product, the number of notifications, the access rate after the notification, the total value of response times, and the open rate of messages after the deadline.

Subsequently, in the step S19, the calculating unit 340 calculates the reaction level for each category based on the access rate after the notification, the total value of response times, and the open rate of messages after the deadline which have been calculated category by category of the product. Next, in the step S20, the updating unit 350 determines, for each of the multiple categories, whether or not the reaction level has improved. At this time, the updating unit 350 updates the setting parameter for the category which has been determined that the reaction level has improved, with the tentative changed value.

Note that the customer group of a product often differs when the category of product differs, and with a different customer group, lifestyle patterns of the customers, and how to react to the notification are often different. In addition, with the different category, the availability or non-availability, and the abundance or scarcity in supply of an alternative product, or qualities of being custom-made or mass-produced often differs. In particular, as for the product without or scarce the alternative product, or the product that is custom-made, the customers often have stronger desire to purchase than the customers for other products, and often have fast reaction speed to the notification. Thus, according to those structures, the notifying device 300 sets the time interval between the notification date and hour and the request deadline category by category, thereby giving the notification at a more appropriate time period in accordance with the category in comparison with conventional technologies.

Fourth Embodiment

In the first embodiment, the explanation was given of an example case in which the notifying device 300 determines the notification date and hour using the same setting parameter regardless of the presence or absence of the automatic extension of a request deadline. In this embodiment, the notifying device 300 determines the notification date and hour using a parameter with a value that is set based on the presence/absence of the automatic extension. Since the notifying device 300 of this embodiment has the same structures and functions as those of the notifying device 300 in the first embodiment, the following explanation will be mainly given of differences from the first embodiment.

The automatic extension of bidding is to extend the bidding deadline to a date and hour that is a later date and hour from the bidding deadline by a predetermined second amount of time, when a bid is placed during a time period until the bidding deadline and from the date and hour that is advanced from the bidding deadline by a predetermined first amount of time. In this embodiment, an explanation will be given of an example case in which both first amount of time and second amount of time are set as five minutes. However, the first amount of time, and the second amount of time are not limited to this value.

First, an explanation will be given of a difference in the table that is stored by the information memory 390 of the notifying device 300 illustrated in FIG. 6. The information memory 390 stores a parameter table as illustrated in FIG. 15 instead of the parameter table in FIG. 9. The parameter table in FIG. 15 stores a record associated with pieces of information that are, for example, information indicating that the automatic extension is placed, a setting parameter for setting the notification date and hour of the deadline with the automatic extension, and information indicating the number of notifications applied to update the setting parameter. In addition, the parameter table in FIG. 15 stores a record associated with pieces of information that are, for example, information indicating that no automatic extension is placed, a setting parameter for setting the notification date and hour of the deadline without the automatic extension, and the information indicating the number of notifications applied to update the setting parameter.

Next, an explanation will be given of a difference in the notifying process utilizing the parameter table.

In the step S11 of the notifying process in FIG. 12, the calculating unit 340 calculates the notification date and hour of the deadline subjected to the automatic extension among the multiple bidding deadlines indicated by the pieces of information stored in the bidding table in FIG. 8 by applying the setting parameter for the deadline subjected to the automatic extension. Conversely, the calculating unit 340 calculates the notification date and hour of the deadline that is not subjected to the automatic extension among the multiple bidding deadlines by applying the setting parameter for the deadline not subjected to the automatic extension.

In addition, in the step S15, the updating unit 350 in FIG. 6 determines a tentative changed value of the setting value for each of the setting parameter for the deadline with the automatic extension, and the setting parameter for the deadline without the automatic extension. In addition, in the step S18, the calculating unit 340 calculates, for respective deadlines with and without the automatic extension, the number of notifications of the deadline, the access rate after the notification, the total value of response times, and the open rate of messages after the deadline.

Subsequently, in the step S19, the calculating unit 340 calculates the reaction level for each of the deadlines with the automatic extension and without the automatic extension based on the access rate after the notification, the total value of response times, and the open rate of messages after the deadline which have been calculated for respective cases of deadlines with and without the automatic extension. Next, in the step S20, the updating unit 350 determines whether or not the reaction level has improved for each of the deadlines with and without the automatic extension. At this time, when determining that the reaction level in the case of the deadline with the automatic extension has improved, the updating unit 350 updates the setting parameter for the deadline with the automatic extension with the tentative changed value, and when determining that the reaction level in the case of the deadline without the automatic extension has improved, the updating unit updates the setting parameter for the deadline without the automatic extension with the tentative changed value.

Note that how the user reacts to the notification often differs as the presence or absence of the automatic deadline extension differs. This is because a request must be placed by the deadline when there is no automatic extension to the deadline, while it is possible for the user to place a request by the extended deadline when there is the automatic extension to the deadline even if the request was not placed by the original deadline. Thus, according to those structures, the notifying device 300 sets the time interval between the notification date and hour and the request deadline for each of the transactions with the automatic extension of the deadline, and without the automatic extension thereof, thereby giving the notification at more appropriate time period in accordance with the presence/absence of the automatic extension in comparison with conventional technologies.

Fifth Embodiment

In the first embodiment, the explanation was given of an example case in which the notifying device 300 stores the watch list, and transmits, when the notification date and hour comes, the notification message to the terminal device that is used by each of the multiple users who is registered in the watch list. In this embodiment, however, the notifying device 300 does not store the watch list, and not transmit the notification message. Since the terminal devices 110, 120, and the notifying device 300 of this embodiment have the same structures and functions as those of the terminal devices 110, 120, and the notifying device 300 in the first embodiment, the following explanation will be mainly given of differences from the first embodiment.

The terminal devices 110 and 120 have the same structures as those of the notifying device illustrated in FIG. 5, and each include the CPU, the ROM, the RAM, a large capacity memory, the media controller, the LAN card, the video card, the display 119 like the LCD, the speaker, and the input hardware 111 like the touch panel which are connected to one another via a bus. Note that since both terminal devices 110 and 120 have the same structure and perform the same operation, the following explanation will be mainly given of the terminal device 110.

Figure 17:
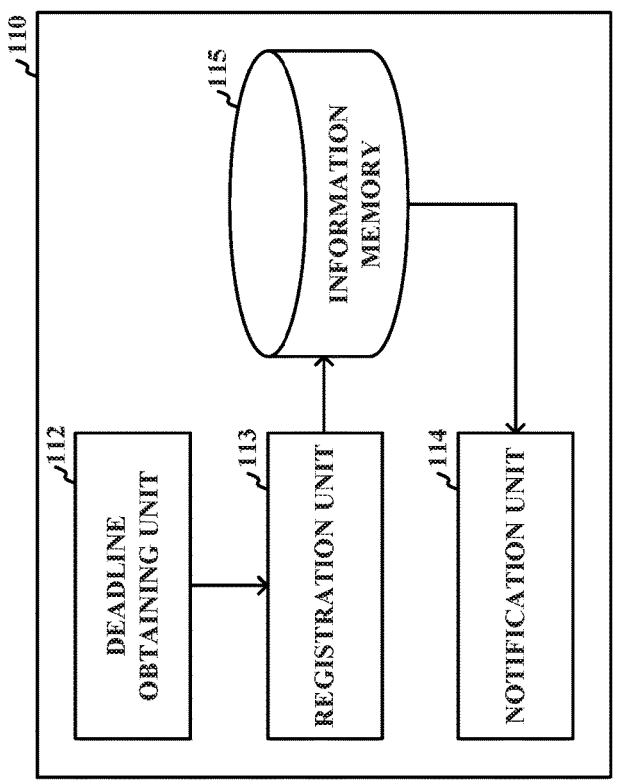
FIG. 17 is a functional block diagram illustrating example functions of a terminal device according to the fifth embodiment.

The CPU of the terminal device 110 executes an application for the auction stored in the large capacity memory to function as a deadline obtaining unit 112, a registration unit 113, and a notification unit 114 illustrated in FIG. 17. In addition, the large capacity memory works together with the CPU to function as an information memory 115.

The terminal device 110 receives, from the notifying device 300 through the LAN card, the multiple sets of the product ID that is put up in the auction, the information indicating the product name, the information indicating the current price, and the information indicating the bidding deadline, and, also the setting parameter, and displays these pieces of received information.

Next, the user who has checked the display gives an operation like to select a product to be watched, and the terminal device 110 inputs the watching product ID in accordance with the operation. Subsequently, the deadline obtaining unit 112 of the terminal device 110 obtains, from the LAN card, information indicating the bidding deadline combined with the watching product ID, and the setting parameter.

Next, the registration unit 113 sets, as the notification date and hour, a date and hour that is advanced from the bidding deadline by an amount of time represented by the setting parameter. Subsequently, the registration unit 113 additionally registers, in the watch list stored in the information memory 115 of the terminal device 110, information indicating the notification date and hour associated with the watching product ID, and the information indicating the bidding deadline for the watching product.

Next, the notification unit 114 of the terminal device 110 periodically obtains the current date and hour. When the current date and hour reaches the notification date and hour registered in the watch list, the notification unit 114 creates the notification message that notifies the user of the approaching bidding deadline for the watching product that is identified by the product ID associated with the notification date and hour. Next, the notification unit 114 outputs the notification message through the display 119 or the speaker to notify the user of the deadline.

When the notification message is output, the terminal device 110 creates detail information indicating that the notification message is output. Subsequently, the terminal device 110 transmits, to the notifying device 300, the created detail information in association with the product ID of the product for which the notification of the deadline has been made, and the user ID of the user who has checked the notification. This is to store a log in the notifying device 300.

Likewise, when the user gives an operation to select the bidding product, the terminal device 110 additionally registers, in the watch list of the terminal device, the bidding product ID, the information indicating the bidding deadline, and the information indicating the notification date and hour in association with one another.

When the user gives the operation indicating that the user has checked the notification message, the terminal device 110 creates detail information indicating that the notification message has been checked. Subsequently, the terminal device 110 transmits, to the notifying device 300, the product ID of the product for which the notification of the deadline has been made, and the user ID of the user who has checked the notification in association with each other.

Figure 16:
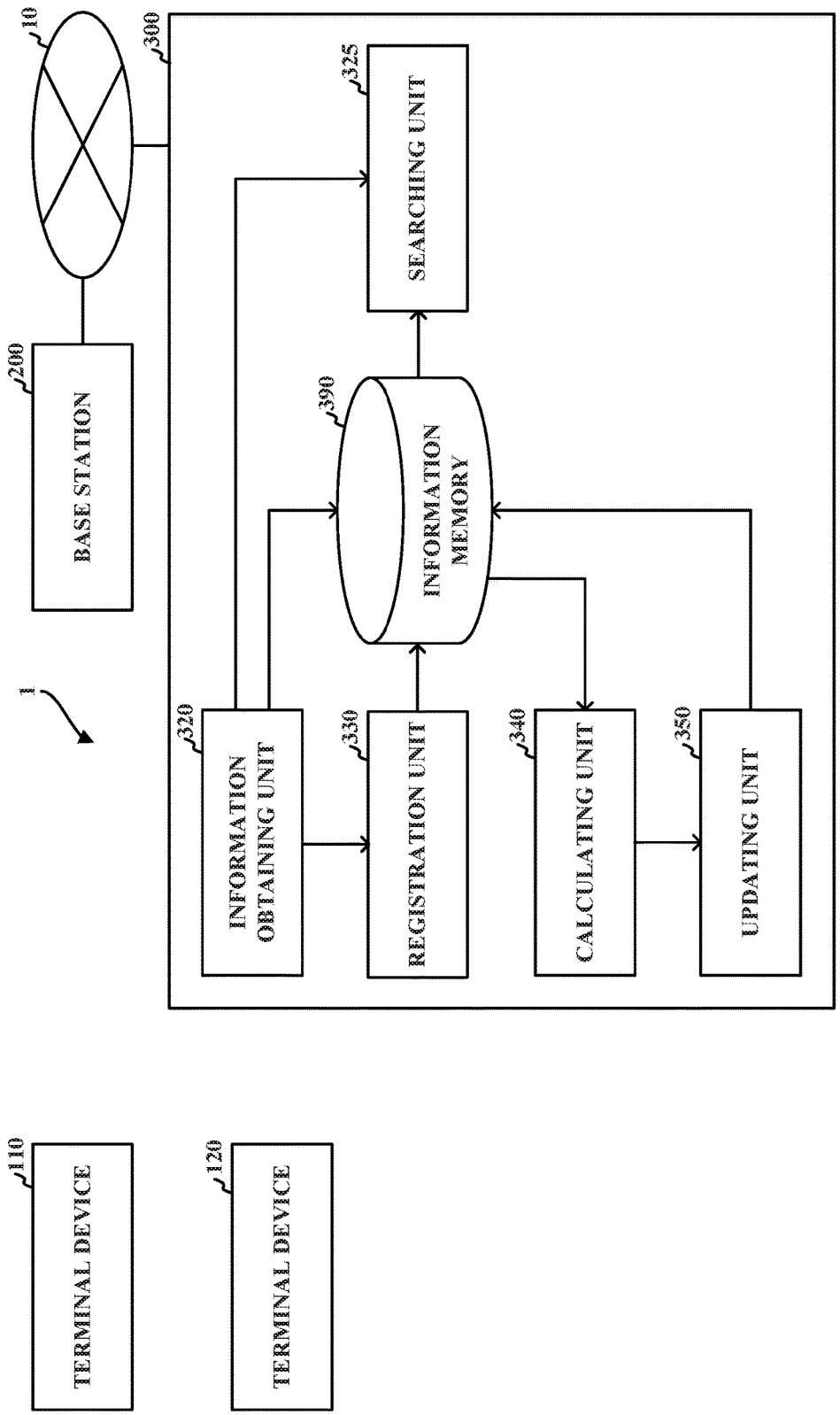
FIG. 16 is a system structure diagram illustrating an example structure of a notifying system according to a fifth embodiment.

The notifying device 300 of this embodiment includes, as illustrated in FIG. 16, the information obtaining unit 320, the searching unit 325, the registration unit 330, the calculating unit 340, and the updating unit 350.

In the notifying process in FIG. 12, the notifying device 300 does not execute the notification message outputting process in the step S13. This is because the terminal device 110 outputs the notification message. However, the notifying device 300 executes the processes other than the step S13 through the information obtaining unit 320, the searching unit 325, the registration unit 330, the calculating unit 340, and the updating unit 350 to update the setting parameter with a more appropriate value, and transmits the updated setting parameter to the terminal device 110 in accordance with a request.

According to those structures, the terminal device 110 notifies the user of approaching deadline, thereby reducing the process load that is necessary for the notifying device 300 to give the notification in comparison with conventional technologies or the first embodiment. Thus, even if the number of users who watch the transactions increases, it is possible for the notifying device 300 to suppress an increase in the process load, thereby preventing a notification delay due to the increase in the process load.

Note that as for the value of the setting parameter, the terminal device 110 can apply not only the values transmitted from the notifying device 300, but also, for example, a predetermined value like 30 minutes, and a value that is input by the user. The terminal device 110 can change the values of the setting parameters in accordance with the selection operation by the user. According to this structure, it is possible to prevent the notifying device from notifying the user of the deadline at a time that is not intended by the user.

Sixth Embodiment

In the first embodiment, the explanation was given of an example case in which, in the step S15 in FIG. 12, the updating unit 350 of the notifying device 300 determines at random whether the tentative changed value of the setting parameter is increased by a predetermined value or decreased by a predetermined value from the current value of the setting parameter. However, the present disclosure is not limited to this case. When, for example, determining that the reaction level has improved as a consequence of tentatively changing the setting parameter by increasing the value by a predetermined value at the last time, the updating unit 350 may increase, this time as well, the current value of the setting parameter by a predetermined value, or may increase a probability of increasing the current value of the parameter by the predetermined value. Conversely, when determining that the reaction level has improved as a consequence of tentatively changing the setting parameter by decreasing a predetermined value at the last time, the updating unit 350 may decrease, this time as well, the value of the current setting parameter by a predetermined value, or may increase a probability of decreasing the current value of the setting parameter by the predetermined value.

Seventh Embodiment

In the first embodiment, the explanation was given of an example case in which the calculating unit 350 of the notifying device 300 calculates the access rate after the notification, the total value of the response times, and the open rate of messages after the deadline, and also calculates the reaction level that has a correlation with these values. In the seventh embodiment, the reaction level having a negative correlation with a rate of users who have made an access timely but missed the bidding opportunity in the number of users who had made an access timely by the bidding deadline is calculated.

More specifically, first, the calculating unit 350 calculates, based on the data stored in the log table in FIG. 10, the number of users (hereinafter, referred to as the timely accessed users) who have accessed the bidding request page during the time period after the notification and to the bidding deadline. In addition, the calculating unit 350 calculates the number of users (hereinafter, referred to as the bidding-opportunity missed users) who have not place a bid among the users who have timely made an access. Still further, the calculating unit 350 calculates a rate of bidding-opportunity missed users relative to the timely accessed users, and calculates the reaction level that has a negative correlation with this calculated rate. The updating unit 350 updates the setting parameter so as to improve the reaction level that has the negative correlation with this calculated rate.

In the first embodiment, the explanation was given of an example case in which the notifying device 300 determines the notification date and hour using the setting parameter that is common to all users. However, the present disclosure is not limited to this case, and the notification date and hour may be determined using setting parameters that are unique to individual users. In addition, the notification date and hour may be determined using a setting parameter that is prepared for each customer group to which the user belongs.

The notifying device 300 according to the first to seventh embodiments may further store information indicating a program schedule, and information indicating a predicted viewing rating of a program in association with each other. The notifying device may increase the value of the setting parameter when at least one viewing rating of the program broadcasted during the time period from a time point that is advanced by a predetermined amount of time from the deadline and to the deadline is greater than a predetermined threshold value.

In the first to seventh embodiments, the explanation was given of the electronic business transactions, but the present disclosure is not limited to this type of transaction. The transactions may be, in addition to business transactions, free loaning and leasing. In addition, the transactions may be transactions other than electronic transactions, and a part or all of the transactions may be not performed through electronic information communication via a computer network.

In the first to seventh embodiments, the explanation was given of an example case in which a transaction with a set request deadline is the auction transaction. However, the present disclosure is not limited to this type of transaction, and transactions may be for bargain sale products set with a time-sale and a special-sale period.

In the first to seventh embodiments, the explanation was given of an example case in which a transaction request is a bidding in the auction. However, the present disclosure is not limited to this type of transaction, and the transaction request may be a purchase request for a product, and a request for rent.

In the first to seventh embodiments, the explanation was given of an example case in which things for transactions are products. However, things for transactions may be services, and may be anything that can be subjected to transaction. The term product means an object that can be subjected to a business transaction, and is not limited to a movable property, but includes an immovable property, but the present disclosure is not limited to these matters. The term service means a work or a benefit for somebody else which can be independently subjected to a business transaction, but the present disclosure is not limited to these matters.

In the first to seventh embodiments, the explanation was given of an example case in which the number of accesses after the notification is the number of counted accesses made by the notified users after the notification and until the deadline among a total number of accesses to the bidding request pages of the products for which the notification of approaching bidding deadline has been made. However, the present disclosure is not limited this case. The number of accesses after the notification may be a number of counted initial accesses only. That is, the number of accesses after the notification may be the number of counted initial accesses made by the notified users after the notification and until the deadline among the total number of accesses to the bidding request pages of the products for which the notification of approaching bidding deadline has been made. In addition, the number of accesses after the notification may be a number of counted accesses made within a predetermined time period which starts from the notification date and hour and ends before the deadline. Still further, the number of accesses after the notification may be a number of counted accesses made during the time period until the time point at which the deadline approaches after any time point among the transmission date and hour of the notification mail, the date and hour of confirmation, and the date and hour at which the message is opened.

The response time may be a time period until the initial access is made after the notification mail is transmitted. That is, the response time may be the time period from the time point at which the notification mail is transmitted and to the time point at which the user who has checked the notification mail initially accesses the bidding request page of the product for which the notification of deadline has been made. In addition, the response time may be a time period after the time point at which the notification mail is transmitted and to the time point at which the bidding request page is accessed within a predetermined time period which starts from the transmission date and hour and ends before the deadline. Still further, the response time may be a time period until the time point at which the bidding request page is accessed before the deadline after any time point among the time point at which the notification mail is transmitted, the time point at which the user checks the notification mail, and the time point at which the message is opened.

In the first to sixth embodiments, the explanation was given of an example case in which the calculating unit 340 calculates the reaction level such that the access rate after the notification and the reaction level have a positive correlation, the total value of response times and the reaction level have a negative correlation, and the open rate of messages after the deadline and the reaction level have a negative correlation. However, the present disclosure is not limited to this case, and the calculating unit 340 may calculate the reaction level that has a correlation only with any one of the access rate after the notification, the total value of response time periods, and the open rate of messages after the deadline, or may calculate the reaction level that has a correlation only with any two of the access rate, the total value of response time periods, and the open rate of messages after the deadline.

The first to seventh embodiments can be combined one another. Needless to say, the present disclosure can be embodied as the notifying device 300 that includes the structures to realize the functions of any of the first to seventh embodiments. The present disclosure can also be embodied as a system which includes multiple devices and which also includes, as a whole system, the structure to realize the functions of any of the first to seventh embodiments.

In addition, it is needless to say the notifying device 300 can be provided which includes the structures to realize the functions of any of the first to seventh embodiments beforehand. An existing notifying device can also be caused to function as the notifying device 300 according to any of the first to seventh embodiments by applying a program. That is, the program for realizing each functional structure of the notifying device 300 exemplified in any of the first to seventh embodiments can be applied so as to be executed by a computer (a CPU or the like) that controls the existing notifying device, and thus the existing notifying device can be caused to function as the notifying device 300 of any of the first to seventh embodiments.

A distribution method of such a program is optional, and the program can be stored and distributed in, for example, a non-transitory recording medium, such as a memory card, a CD-ROM, or a DVD-ROM, and can be distributed via a communication medium like the Internet. Furthermore, a method according to the present disclosure can be performed by utilizing the notifying device 300 of any of the first to seventh embodiments.

The preferable embodiments of the present disclosure were described above in details, but the present disclosure is not limited to any particular embodiments, and various modifications and changes can be made within the scope of the invention as recited in appended claims.

The embodiments described above are intended for purposes of illustration only and are not intended to limit the scope of the present disclosure in any way. Therefore, the scope of the present disclosure is defined by the appended claims rather than the embodiments described above. Further, various modifications made within the scope of the claims and within the same purposes thereof should be included within the scope of the present disclosure.

REFERENCE SIGNS LIST

10 Communication network
110, 120 Terminal device
111, 121 Input hardware
112 Deadline obtaining unit
113 Registration unit
114 Notification unit
115 Information memory
119, 129 Display
300 Notifying device
301 CPU
302 ROM
303 RAM
304 Hard disk
305 Media controller
306 LAN card
307 Video card
308 LCD
309 Keyboard
310 Speaker
311 Touchpad
320 Information obtaining unit
325 Searching unit
330 Registration unit
340 Calculating unit
350 Updating unit
360 Deadline obtaining unit
370 Notification sending unit
390 Information memory

The invention claimed is:

1. A notifying device comprising:
at least one memory configured to store computer program code; and
at least one processor configured to access the at least one memory and operate according to the computer program code, the computer program code including:
obtaining code configured to cause the at least one processor to obtain, for a first transaction of a plurality of transactions, a first notification date and hour, wherein the first notification date and hour is earlier by a tentative time interval than a first deadline for the first transaction,
notification code configured to cause the at least one processor to automatically transmit, to a plurality of users who view the first transaction, a first notification by e-mail of the first deadline for the first transaction after the first notification date and hour obtained for first transaction occurs, calculating code configured to cause the at least one processor to calculate a first reaction level to the first notification by e-mail based on a set of actions taken for the first transaction by the plurality of users to whom the first notification by e-mail was sent, wherein:
the set of actions includes opening the first notification by e-mail, wherein the opening the first notification by e-mail is by a notified user, and the first reaction level is calculated based on a time of the opening the first notification by e-mail, and
updating code configured to cause the at least one processor to:
when the first reaction level represents an improvement over an earlier reaction level, update a set time interval by the tentative time interval so as to improve a second reaction level to a second notification by e-mail of a second deadline for a second transaction of the plurality of transactions, and
when the first reaction level does not represent an improvement over the earlier reaction level, not update the set time interval by the tentative time interval,
wherein the obtaining code is further configured to cause the at least one processor to obtain, for the second transaction, a second notification date and hour earlier by the set time interval than a second deadline for the second transaction, and
wherein the notification code is further configured to cause the at least one processor to automatically transmit the second notification by e-mail at the second notification date and hour.

2. The notifying device according to claim 1, wherein the set time interval is set for each time slot to which one or more of products or services for the plurality of transactions belongs.

3. The notifying device according to claim 1, wherein the set time interval is set for each category to which one or more of products or services for the plurality of transactions belongs.

4. The notifying device according to claim 1, wherein:
the set time interval includes a first set time interval and a second set time interval,
the first set time interval is set for a third transaction that has a deadline automatically extended,
the second set time interval is set for a fourth transaction that does not have the deadline automatically extended,
the first transaction is the third transaction and the first deadline for the first transaction is the deadline automatically extended, or the first transaction is the fourth transaction and the first deadline is not the deadline automatically extended, and
the second transaction is the third transaction and the second deadline for the second transaction is the deadline automatically extended, or the second transaction is the fourth transaction and the second deadline is not the deadline automatically extended.

5. The notifying device of claim 1, wherein the obtaining code is further configured to cause the at least one processor to set the tentative time interval as a random value.

6. The notifying device of claim 1, wherein the obtaining code is further configured to cause the at least one processor to, when the first reaction level represents the improvement over the earlier reaction level and the tentative time interval represents an increase, increase a probability of setting a second tentative time interval by increasing the set time interval by a predetermined value.

7. A system comprising a server that manages a plurality of transactions, and a plurality of terminal devices that communicates with the server,
wherein the plurality of terminal devices respectively comprises:
at least a first memory; and
at least a first processor configured to access the first memory and operate according to a first computer program code, the first computer program code comprising:
communication code configured to obtain a tentative time interval from the server,
obtaining code configured to cause the at least first processor to obtain, for a first transaction of a plurality of transactions, a first notification date and hour, wherein the first notification date and hour is earlier by a tentative time interval than a first deadline for the first transaction, and
notification code configured to cause the at least first processor to automatically notify a user who views the first transaction of a first notification by e-mail of the first deadline for the first transaction after the first notification date and hour obtained for the first transaction occurs;
the server comprises:
at least a second memory configured to store a second computer program code; and
at least a second processor configured to access the at least second memory and operate according to the second computer program code, the second computer program code including:
calculating code configured to cause the at least second processor to calculate a first reaction level to the first notification by e-mail based on a set of actions taken for the first transaction by a plurality of users to whom the first notification by e-mail is notified by the plurality of terminal devices, wherein
the set of actions includes opening the first notification by e-mail, wherein the opening the first notification by e-mail is by a notified user, and the first reaction level is calculated based on a time of the opening the first notification by e-mail; and
updating code configured to cause the at least second processor to:
when the first reaction level represents an improvement over an earlier reaction level, update a set time interval by the tentative time interval so as to improve a second reaction level to a second notification by e-mail of a second deadline for a second transaction of the plurality of transactions, and
when the first reaction level does not represent an improvement over the earlier reaction level, not update the set time interval by the tentative time interval,
wherein the communication code is further configured to cause the at least first processor to obtain the updated set time interval from the server, and
the obtaining code is further configured to cause the at least first processor to obtain, for the second transaction, a second notification date and hour earlier by the set time interval than the second deadline for the second transaction, and wherein the notification code is further configured to cause the at least first processor to automatically transmit the second notification by e-mail at the second notification date and hour.

8. A non-transitory computer-readable recording medium having stored thereon computer program code to be executed by at least one processor of a computer to cause the at least one processor to:
   obtain, for a first transaction of a plurality of transactions, a first notification date and hour, wherein the first notification date and hour is earlier by a tentative time interval than a first deadline for the first transaction;
   automatically transmit, to a plurality of users who view the first transaction, a first notification by e-mail of the first deadline for the first transaction after the first notification date and hour obtained for first transaction occurs;
   calculate a first reaction level to the first notification by e-mail based on a set of actions taken for the first transaction by the plurality of users to whom the first notification by e-mail was sent, wherein:
      the set of actions includes opening the first notification by e-mail, wherein the opening the first notification by e-mail is by a notified user, and the first reaction level is calculated based on a time of the opening the first notification by e-mail;
   when the first reaction level represents an improvement over an earlier reaction level, update a set time interval by the tentative time interval so as to improve a second reaction level to a second notification by e-mail of a second deadline for a second transaction of the plurality of transactions;
   when the first reaction level does not represent an improvement over the earlier reaction level, not update the set time interval by the tentative time interval;
   obtain, for the second transaction, a second notification date and hour earlier by the set time interval than a second deadline for the second transaction; and
   automatically transmit the second notification by e-mail at the second notification date and hour.

9. A method for operating a notifying device, the method comprising:
   obtaining, for a first transaction of a plurality of transactions, a first notification date and hour, wherein the first notification date and hour is earlier by a tentative time interval than a first deadline for the first transaction;
   automatically transmit, to a plurality of users who view the first transaction, a first notification by e-mail of the first deadline for the first transaction after the first notification date and hour obtained for first transaction occurs;
   calculating a first reaction level to the first notification by e-mail based on a set of actions taken for the first transaction by the plurality of users to whom the first notification by e-mail was sent, wherein:
      the set of actions includes opening the first notification by e-mail, wherein the opening the first notification by e-mail is by a notified user, and the first reaction level is calculated based on a time of the opening the first notification by e-mail;
   when the first reaction level represents an improvement over an earlier reaction level, updating a set time interval by the tentative time interval so as to improve a second reaction level to a second notification by e-mail of a second deadline for a second transaction of the plurality of transactions;
   when the first reaction level does not represent an improvement over the earlier reaction level, not updating the set time interval by the tentative time interval;
   obtaining, for the second transaction, a second notification date and hour earlier by the set time interval than a second deadline for the second transaction; and
   automatically transmitting the second notification by e-mail at the second notification date and hour.

* * * * *